(12) United States Patent
Southwick et al.

(10) Patent No.: US 8,619,967 B2
(45) Date of Patent: *Dec. 31, 2013

(54) NETWORKED CONTACT CENTER

(75) Inventors: Richard Southwick, San Francisco, CA (US); Robert Townsend, Mt. View, CA (US); Mansour Salame, Atherton, CA (US)

(73) Assignee: 8x8, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,149

(22) Filed: Aug. 29, 2012

(65) Prior Publication Data

US 2012/0321069 A1 Dec. 20, 2012

Related U.S. Application Data

(63) Continuation of application No. 12/201,599, filed on Aug. 29, 2008, now Pat. No. 8,275,116.

(51) Int. Cl.
*H04M 3/00* (2006.01)

(52) U.S. Cl.
USPC .................... 379/265.02; 379/265.09

(58) Field of Classification Search
USPC ............................. 379/265.02, 265.09
See application file for complete search history.

*Primary Examiner* — Rasha Al Aubaidi
(74) *Attorney, Agent, or Firm* — Crawford Maunu PLLC

(57) ABSTRACT

This document discusses, among other things, a networked contact center that includes multiple platforms to host multiple tenants. Example embodiments include receiving a message associated with one of the tenants and identifying one or more of the platforms associated with the message. For some example embodiments, the networked contact center may allow the platform to access a data location that is both associated with the tenant and shared by two or more of the multiple tenants.

15 Claims, 10 Drawing Sheets

| TENANT ID | PRIMARY PLATFORM | SECONDARY PLATFORM |
|---|---|---|
| DNIS1 | PLATFORM 7 | PLATFORM 1 |
| DNIS2 | PLATFORM 3 | PLATFORM 4 |

| AGENT ID | PRIMARY PLATFORM | SECONDARY PLATFORM |
|---|---|---|
| U/P1 | PLATFORM 10 | PLATFORM 3 |
| U/P2 | PLATFORM 11 | PLATFORM 2 |

| TENANT ID | DATA TYPE | LOCATION 0 | LOCATION 1 |
|---|---|---|---|
| DNIS | PROMPT | REPOSITORY 4 | REPOSITORY 2 |
| DNIS | RECORDING | REPOSITORY 1 | REPOSITORY 10 |
|  |  |  |  |

NETWORKED CONTACT CENTER

RELATED PATENT DOCUMENT

This patent document is a continuation under 35 U.S.C. §120 of U.S. patent application Ser. No. 12/201,599 filed on Aug. 29, 2008, and entitled: "Networked Contact Center" (U.S. Pat. No. 8,275,116), which is fully incorporated herein by reference.

TECHNICAL FIELD

This patent document pertains generally to contact centers, and more particularly, but not by way of limitation, to a networked contact center hosting multiple tenants.

BACKGROUND

Traditional contact centers are referred to as call centers, which are designed to enable a company to handle calls from their clients. The calls received from clients may be distributed to multiple call agents according to certain call distribution and handling methodologies. Ideally, a call center is designed to handle calls with minimal client waiting time, minimal dropped calls, even call distribution to agents, and minimal downtime. Any drastic fluctuations in one or more of these criteria may result in loss of business and/or customer satisfaction.

Traditional call centers are normally built to be operated on-premise using proprietary systems with propriety hardware and software. These on-premise call center systems are generally very costly to maintain. The systems typically require support staff. Furthermore, the systems may be inflexible in the type of applications and hardware that can be supported, limiting the company's ability to upgrade and grow along with any potential increase in demand. Even when the upgrade options are available, they tend to be very costly and may require replacing a current system with another more advanced system, causing further stress to the supporting staff, the agents and the clients.

BRIEF DESCRIPTION OF DRAWINGS

Some embodiments are illustrated by way of example and not limitation in the figures of the accompanying drawings in which.

DETAILED DESCRIPTION

Figure 1:
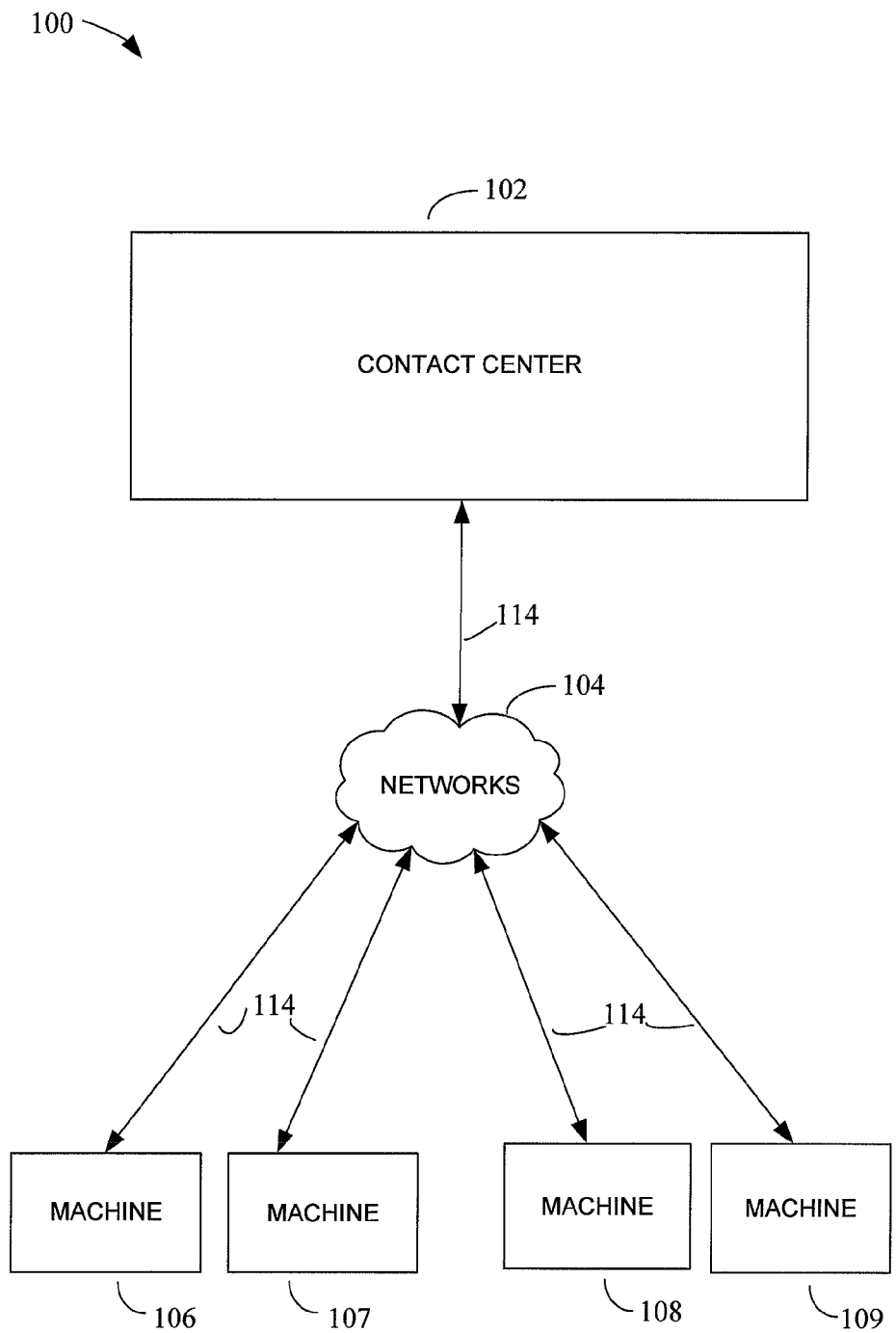
FIG. 1 is a high level diagrammatic representation of an on-demand contact center, according to an example embodiment.

In various example embodiments described herein a networked contact center may be organized as layers including a telephony layer to receive communications, a platform layer to support multiple tenants and a storage layer to store tenant data for the multiple tenants. The example networked contact center may include multiple platforms, each including resources such as call distribution software, skills based routing software, an agent web interface and other contact center services, to support multiple tenants.

The networked contact center may receive contact or communications from a customer or an agent of a particular tenant and route the communication to a platform that supports the tenant. For some example embodiments, tenants are supported by an active and inactive platform. Example embodiments provide for allowing an inactive platform to relieve the active platform of supporting a tenant when the active platform is unavailable due to failure or system maintenance.

In various example embodiments, tenant data such as list of agents, agents' skills, voice response data, etc. are stored for the multiple tenants on common repositories. Example embodiments include locating within the shared repositories tenant data belonging to a particular tenant. Agent supervisors may add, remove or change tenant data in the shared repositories. Example embodiments may include propagating changes made in a storage layer to maintain coordination of data transfer between the telephony layer, the platform layer and the storage layer.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice embodiments of the invention. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Contact Center

FIG. 1 is a block diagram showing an example networked contact center 100, in accordance with an example embodiment. FIG. 1 is shown to include a contact center 102 that is communicatively coupled with networks 104, via transmission media 114. Also communicatively coupled with the networks 104 via the transmission media 114 are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VoIP), analog telephone, online chat, text messaging, electronic mail (email), video conferencing, screen sharing, web conferencing and file sharing, radio broadcast, etc. It is to be appreciated that example forms of communication are provided herein to illustrate types of contact and not to limit the meaning of contact to certain forms of communication.

The contact center 102 may perform various contact-related tasks (described in more detail below), on behalf of one or more tenants. The contact center 102 may be implemented in software, hardware or a combination of both software and hardware. The contact center 102 may comprise contact center machines (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the contact center 102 may be significantly increased when the number of tenants supported by the contact center 102 also increases. One or more of the contact center machines 106-109 may access data associated with the one or more tenants. The data may include, for example, tenant-specific call configuration, agents' identification, supervisors' identification, call recordings, call statistics, etc. For some example embodiments, there may be multiple instances of the same data that may be used for recovery purposes.

Tenant

A tenant is an entity (e.g., a company, an employer, team, division, department, or any other entity having agents and customers, etc.) that seeks to address contact made by other entities (e.g., customers, employees, associates, etc.) with which the tenant has a relationship. To help respond to such contact, an example tenant may use the contact center 102 to receive the contact, organize the contact, allocate the contact, transmit the contact and to perform other contact center related services for the benefit of the tenant. In addition to using the contact center 102, a tenant may look to yet further entities (e.g., agents, consultants, business partners, etc.) to help address the various contact referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the contact center 102 with the customer that is using the machine 108.

Contact Center Functional Modules

Figure 2:
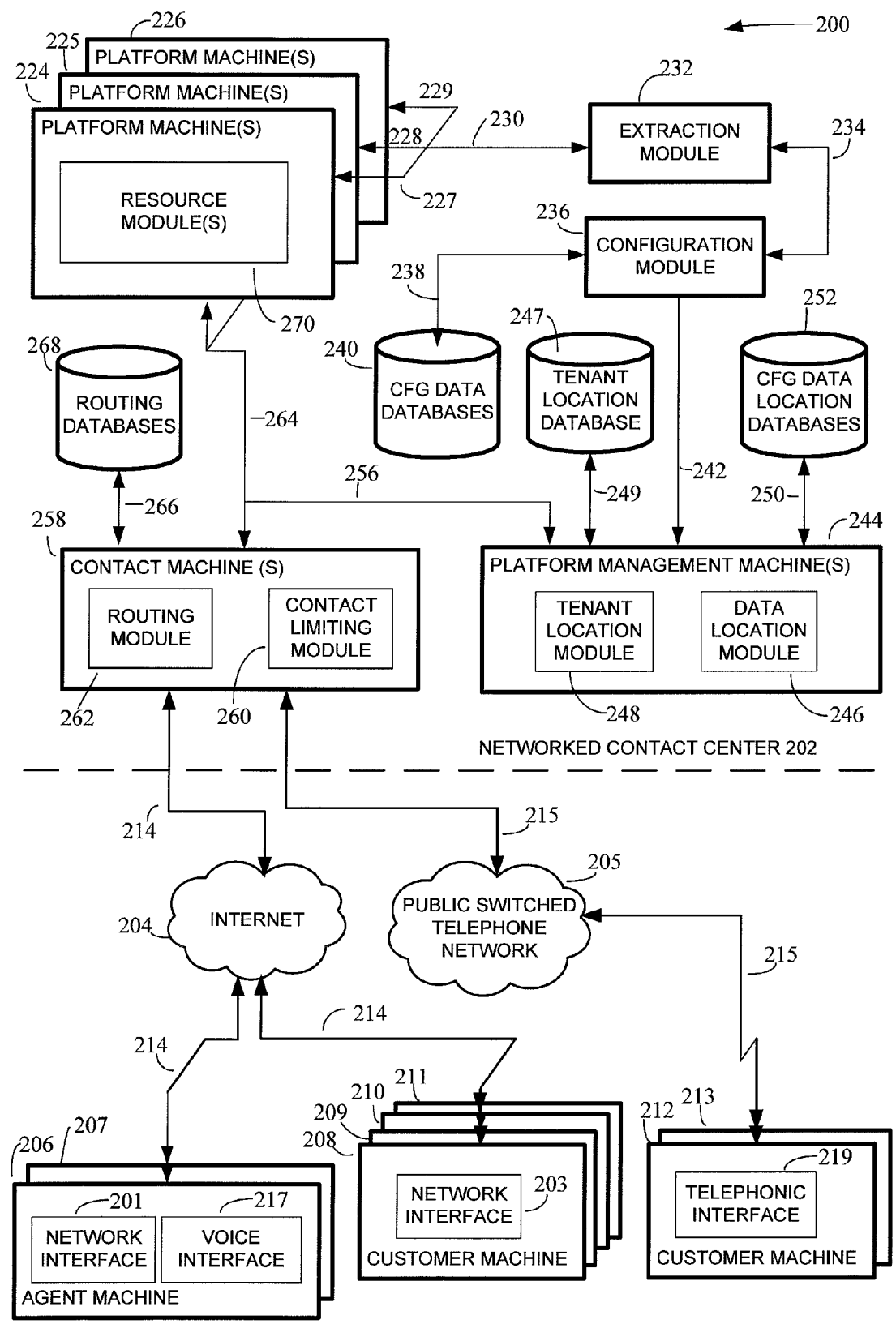
FIG. 2 is a further diagrammatic representation of an on-demand contact center, according to an example embodiment.

FIG. 2 is a block diagram illustrating a network 200, in accordance with an example embodiment. The network 200 is shown to include an example networked contact center 202 communicatively coupled with agent machines 206 and 207 and customer machines 208-211 via the transmission media 214 of the Internet 204. The example networked contact center 202 is further communicatively coupled with customer machines 212 and 213 via the transmission media 215 of the PSTN 205.

Although the current example may illustrate customers and agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement redundancy and/or recovery schemes to reduce system down time.

Figure 3:
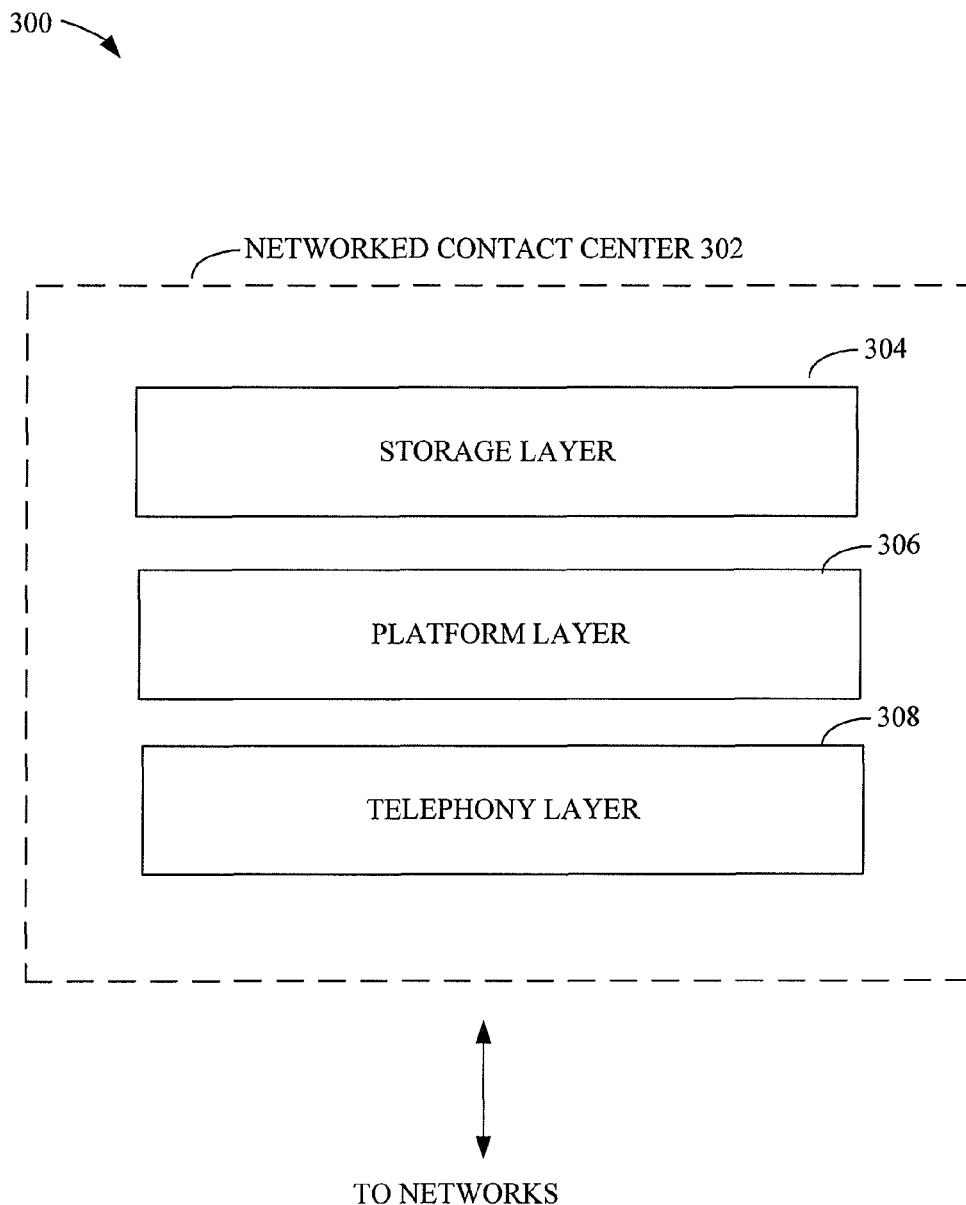
FIG. 3 is a block diagram illustrating a further network, including a networked contact center, organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202, 302 may be organized into multiple logical groups or layers. There may be a storage layer 304, a platform layer 306 and a telephony layer 308. For some example embodiments, the telephony layer 308 may be responsible for receiving calls that come into the networked contact centers 202, 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Each platform machine (e.g., server) may support one or more tenants.

For some example embodiments, each tenant may be associated with two or more platforms. A first platform may be used for a tenant as an active platform, and one or more other platforms may be used for the tenant as an inactive platform that is available in the event the active platform becomes unavailable. A tenant may use multiple platforms as inactive platforms available to provide resources to the tenant in the case of a software failure, hardware failure or platform unavailability due to administrator activities, etc. Incoming calls distributed to a tenant may always be directed to the active platform unless the tenant is reconfigured to direct the incoming calls to an inactive platform. For some example embodiments, the inactive platform is operational and the active platform is operational, even when all calls are being processed by the active platform. This can be advantageous when there are problems with the active platform since switching the operations to the inactive platform may not cause too much delay in the call handlings associated with the tenant. The inactive platform may be re-classified as an active platform at the time operations are switched.

For some example embodiments, the multiple platforms in the platform layer 306 may share the same data in the storage layer 304. The storage layer 304 may be associated with databases and associated database machines. The storage layer 304 may itself be partitioned into multiple images for redundancy and recovery and for efficient access. For some example embodiments, mappings may be used to relate a tenant on a particular platform to the tenant's data in the storage layer 304.

Thus, the contact centers 102, 202, 302 may include logic to receive calls, to determine to which of the multiple supported tenants the calls belong, to distribute the calls to the appropriate platform, and to determine where the data associated with the tenant may be found.

Using the organization described above, the contact centers 102, 202, 302 may be easily upgraded and maintained with little or minimal impact to the tenant. For example, a tenant may be operating with an inactive platform while the active platform is upgraded from one software level to another software level. Once the upgrade is completed, operations may be switched back to the active platform. Similarly, because both the active platform and the inactive platform share the same data in the storage layer 304, switching from the inactive platform to the active platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the example contact center 102 after the switch is complete.

Referring to FIG. 2, platform machines 224-226 may be communicatively coupled with an extraction module 232 via communication channels 227-229, respectively, and communication channel 230. Platform machines 224-226 are further communicatively coupled to contact machine(s) 258. The contact machine(s) 258 are communicatively coupled with the routing databases 268 via the communication channel 266.

Platform management machine(s) 244 are shown to be communicatively coupled with configuration data location databases 252 via communication channel 250, the tenant location database 247 via communication channel 249 and with the contact machine(s) 258 and platform machines 224-226, respectively, via the communication channels 256 and 264. The platform management machine(s) 244 are further shown to be communicatively coupled with the configuration module 236 via communication channel 242, while the configuration module 236 is communicatively coupled with the extraction module 232 and the configuration data databases 240 via communication channels 234 and 238, respectively. The machines and modules of FIG. 2 are to be described in further detail with respect to FIG. 4, which follows.

Figure 4:
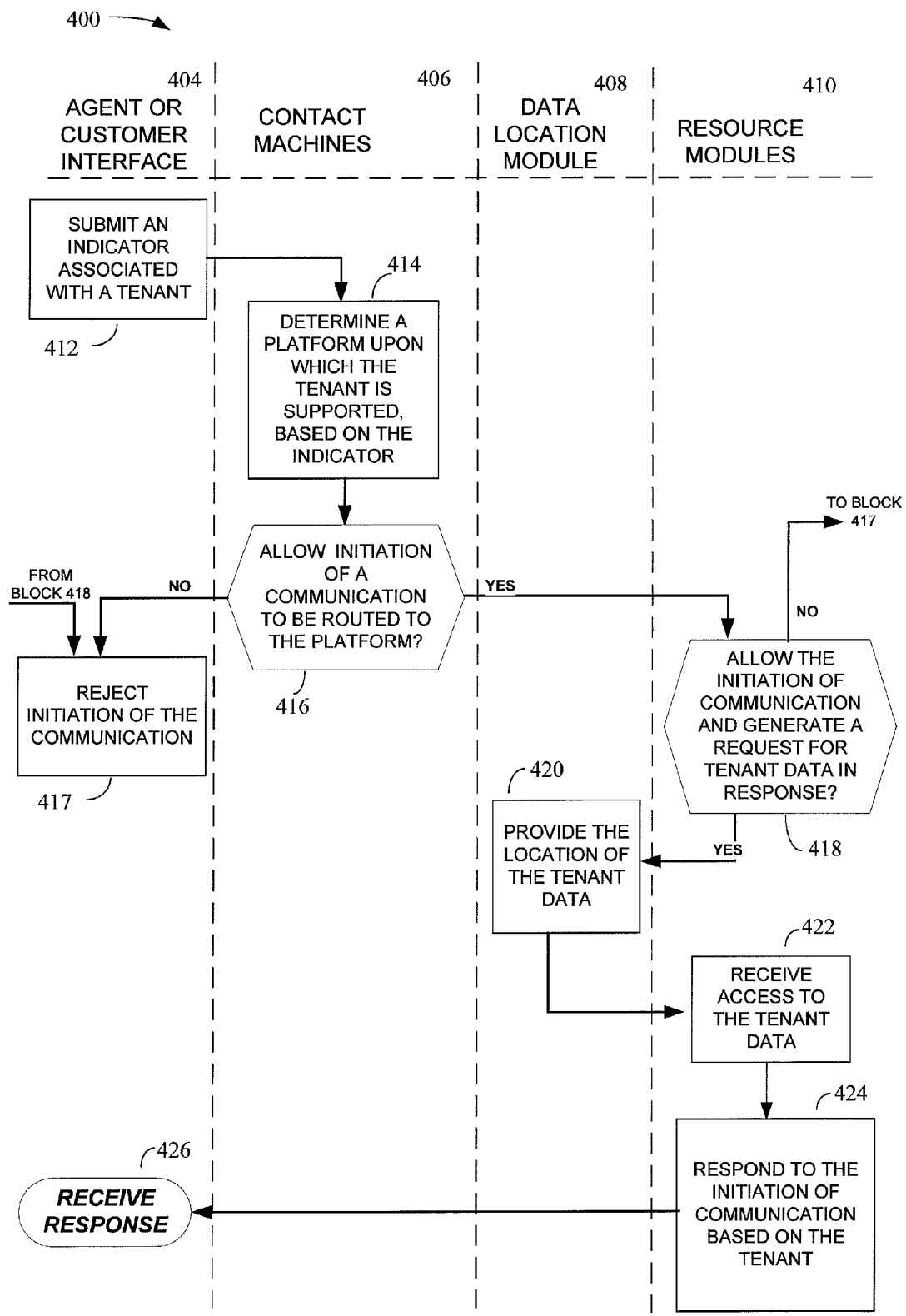
FIG. 4 is a flow diagram illustrating example actions performed by various on-demand contact center components in response to agent or customer contact, according to an example embodiment.

FIG. 4 is a flow diagram 400 showing example actions performed by various components of a contact center for responding to agent or customer contact, in accordance with an example embodiment. In FIG. 4, each column represents a lane in which action(s) are carried out. Actions in lanes 404, 406, 408 and 410 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 412 with an agent or customer submitting an indicator associated with a tenant along with an initiation of communication. In FIG. 2, the customer machine 212 is shown to include a telephonic interface 219 (e.g., a telephone with a handset). In an example embodiment, a customer seeking customer support from a tenant dials a tenant's phone number on a telephone to place a call (e.g., initiation of communication) to the contact center over the PSTN. In an example embodiment, the telephone number itself serves as an indicator of the tenant whose attention is sought by the customer.

Referring to FIG. 2, the customer machine 208 is shown to include a network interface 203 (e.g., a web browser) with which a customer may, for example, submit a chat request to the networked contact center 202 over the Internet to receive, for example, technical support from a tenant. An agent of the tenant or a contact supervisor may also contact the tenant. In an example embodiment, an agent using the agent machine 206 uses the network interface 201 to log on to an agent network server hosted by the networked contact center 202 to notify the networked contact center 202 that the agent is available to be contacted by customers. In some example embodiments, the agent may use the voice interface 217 to speak with a customer or another agent.

In various example embodiments, the indicator submitted at block 412 is received by the contact machines(s) 258. In FIG. 2, the contact machine(s) 258 are shown to include a routing module 262 and a contact limiting module 260. The routing module 262 may route contacts to a certain platform depending on the tenant indicated by the indicator (e.g., a phone number, username/password or any other indicator designating a tenant). The example contact limiting module 260 may regulate incoming contact with the networked contact center 202.

At block 414, the routing module 262 within the contact machines 258 of FIG. 2 may determine a platform upon which the tenant is supported based on the indicator received from the agent or customer at block 412. In an example embodiment, in FIG. 2, the routing module 262 accesses the routing databases 268 via communication channel 266 to associate an indicator with a tenant and a platform. In some example embodiments, the contact machine(s) 258 submit a request, via the communication channel 256 to the platform management machine(s) 244 to determine a platform associated with the indicator (e.g., and a tenant corresponding to the indicator).

At decision block 416, the example flow diagram 400 includes the example contact limiting module 260 within the contact machines 258 of FIG. 2 determining whether to allow the initiation of communication (e.g., a telephone call from a customer) to be routed to a platform (e.g., the platform machine(s) 224).

The contact limiting module's 260 determination of whether to allow the initiation of communication may include referencing a current allowance of contact or communication (e.g., a bucket value, described in more detail below) to be received by a particular communication layer or platform (e.g., within the platform machines 224) in a fixed period of time. In some example embodiments, each platform may vary a maximum allowance of contact for a period of time or vary the period of time based on an availability of platform resources. In some example embodiments, when contact directed to a platform is received by the contact machines 258 and the current allowance is less than or equal to zero, the contact limiting module 260 may reject initiation of the communication as shown in block 417 of FIG. 4. When the contact directed to the platform is received by the contact machines 258 and the current allowance is greater than or equal to one, the contact limiting module 260 may allow the initiation of communication to be routed to the platform as shown between blocks 416 and 418 of FIG. 4.

Alternatively or additionally, determination of whether to allow the initiation of communication may be made by a platform at block 418 after the contact limiting module has allowed the initiation of communication to be routed to the platform at block 416. In various example embodiments, a platform may reject the initiation of communication based on availability of platform resources or other conditions warranting a rejection. Such a rejection is represented by block 417.

In an example embodiment, in FIG. 2, a platform may allow the initiation of communication from the contact machines(s) 258. Example resource module(s) 270 located on the platform machine 224 and located on the other platform machines 225-226, may include various modules that provide services for multiple tenants. Example resource module(s) 270 may include interaction routers, interactive voice recordings, scripting, agent network server, media control and other contact center related services, etc.

In an example embodiment, the initiation of communication is a voice call from a customer seeking help with installing a water heater; the tenant is in the business of providing technical support for refrigerator installations and water heater installations. The tenant employs some agents who address questions about refrigerator installations while the tenant's other agents address questions about water heater installations.

At block 418, the flow diagram 400 includes the resource module(s) 270 of FIG. 2 allowing the initiation of communication and generating a request for data associated with a tenant, based on the initiation of communication. In the appliance installation example, the resource module(s) 270 request tenant data to be used to teleprompt the customer, prompting the customer to press 1 on their telephone dial for refrigerator installation support or to press 2 for water heater installation support.

Example platform machine(s) 224, 225 and 226 may initially request the data associated with the tenant from the extraction module 232 and the configuration module 236. In an example embodiment, to locate data for data access, the resource module(s) 270 may use a different addressing system than the configuration module 236 uses to locate and access the same data. In some example embodiments, the extraction module 232 translates requests from the platform machine(s) 224, 225, 226 to allow the configuration module 236 to understand the request. The configuration module 236 may access the requested data in the configuration data databases 240 and relay the requested data to the resource module(s) 270 on a set of platform machine(s) (e.g., platform machine(s) 224) via the extraction module 232.

The configuration module 236 may not initially locate the requested data in the configuration data databases 240. In some example embodiments, the configuration module 236 may request the location of the requested data from the data location module 246 that may be located within the platform management machine(s) 244.

At block 420, the flow 400 may include the data location module 246 providing the location of the requested data (e.g., the location within the configuration data databases 240) to the configuration module 236. The configuration module 236 may then access the requested data to provide it to the resource module(s) 270 via the extraction module 232.

At block 422 of the flow 400, the example resource module(s) 270 receive access to the requested data (e.g. tenant data). With access to the particular tenant data, an example resource module 270 may generate a particular response to the initiation of communication received from the agent or customer.

At block 424 of the flow 400, the resource module(s) 270 respond to the initiation of the communication based on the data (e.g., the tenant data). The agent or customer that initiated communication may receive the response where the flow ends at terminal 426. In the appliance installation support example, the response to the initiation at terminal 426 may be the tenant's teleprompter asking the customer to indicate the nature of the call.

Example Embodiments

Figure 5:
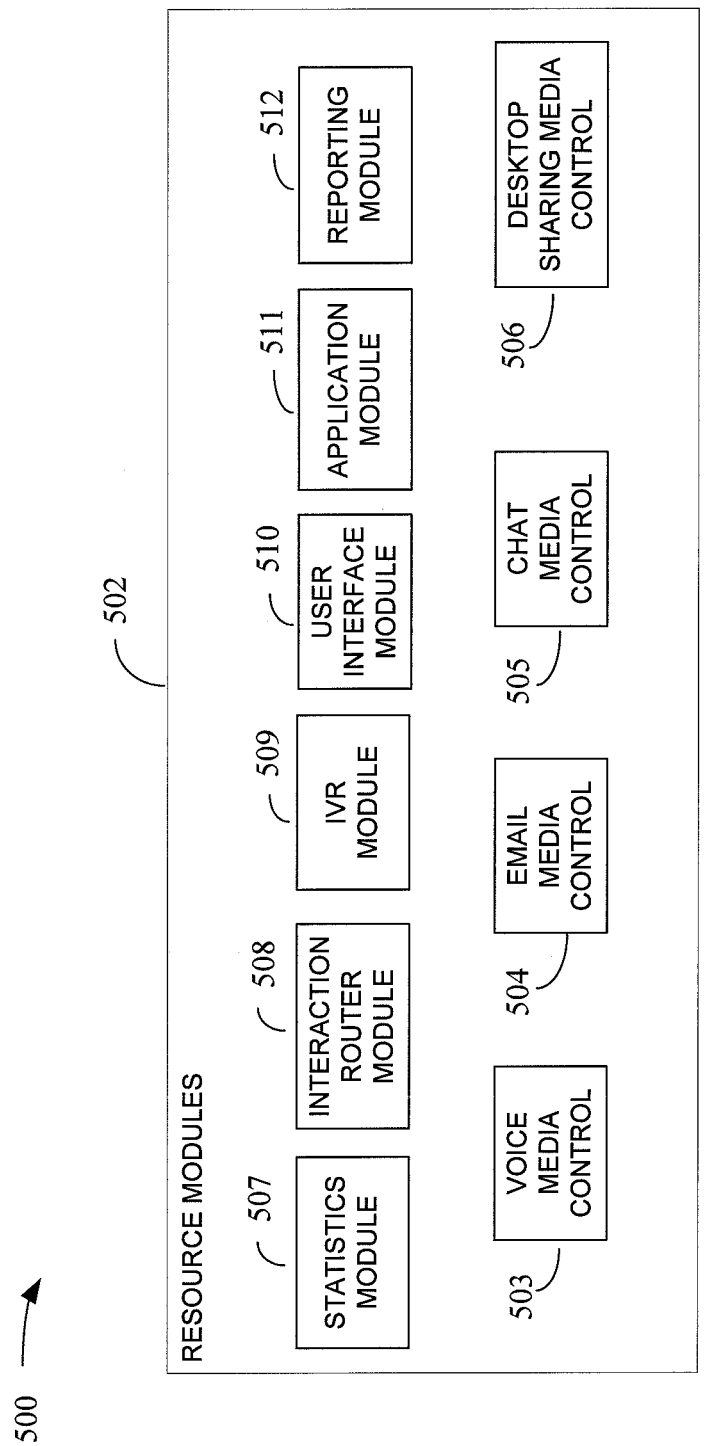
FIG. 5 is a block diagram illustrating example platform resource modules, in accordance with an example embodiment.

FIG. 5 is a block diagram 500 illustrating example platform resource modules 502, in accordance with an example embodiment. The resource modules 502 may be substantially similar to the example resource module(s) referred to previously.

As disclosed above, one or more tenants may be supported by a particular platform. Each platform may include a set of resource modules 502 (e.g., such as the resource module(s) 270 on the platform machine(s) 224 in FIG. 3). In an example embodiment, the resource modules 502 are dedicated to the particular platform on which they exist to provide various services and/or perform various functions related to the one or more tenants. The various services and functions of the resource modules 502 may be implemented with software, hardware or a combination of both software and hardware. In an example embodiment, the resource module(s) 502 are instructions executed by processors in the central processing units of platform machine(s) 224.

The resource modules 502 are shown to include multiple modules 503-512, each discussed below. Different forms of communication directed to a tenant are routed to the media control modules 503-506. The media control modules 503-506 are to process the received media and responsively make requests to other of the platform modules 507-512. In various of example embodiments, a voice call to a tenant may be forwarded to the voice media module 503 by the routing module 262 of FIG. 2. The voice media module 503 may request that an interaction router module 508 and an interactive response module (IVR) 509 perform services related to the communication. In some example embodiments, the services to be performed involve accessing the configuration data databases 240 for data that is specifically associated with the tenant.

The interaction router module 508 may include skills-based routing capability to compare a contacting customer's needs to the skills possessed by a tenant's available agents and to route the call to an appropriate agent. The interaction router module 508 may include state timers that record the time a channel of communication is in a particular state (e.g., in queue, on hold, muted, etc.). The interaction router module 508 may record context of various interactions on an interaction basis and/or for each agent. A private branch exchange (PBX) may be implemented by the interaction router module 508 to connect tenants' communication channels to particular terminals.

The IVR module 509 may direct a caller to a call destination based on detecting caller entered key pad tones and/or spoken words. Depending on caller input, the IVR module 509 may respond to a caller with a real-time or recorded message indicating set menu choices available to the caller. A response to a caller by the IVR module 509 may be based on a combination of the subject matter of the call and the skills possessed by available agents. In some embodiments, the IVR module 509 may also provide email scripts segmentation.

The user interface module 510 is to generate web pages to be accessed by agents and agent supervisors or any other user associated with the networked contact center. The web pages may be used to manage the various forms of contact described herein. In an example embodiment, the user interface module 510 makes contact status information and agent status information available on the web pages. In example embodiments, the user interface module 510 generates reports based on various contact related statistics and/or context information, to be accessed by agent supervisors (e.g., for performance evaluation, etc.). Example web pages may include agent profile pages, customer relationship management (CRM) pages, frequently asked questions (FAQS) pages, help pages, supervisor control panel pages, reports pages or any other page that may be useful to one associated with the networked contact center.

A CRM application may be integrated with the networked contact center through the application module 511. In general, CRM software includes different features designed to enhance service provided to a customer.

The statistics module 507 may maintain statistics for each agent and/or for each skill possessed by a tenant's agents. An example reporting module 512 may obtain the statistics kept by the statistics module 507 to generate real-time and/or historical reports. Example statistics may include sums, averages, compound values and totals in different intervals as well as other statistics.

Figures 6, 7, 8, 9:
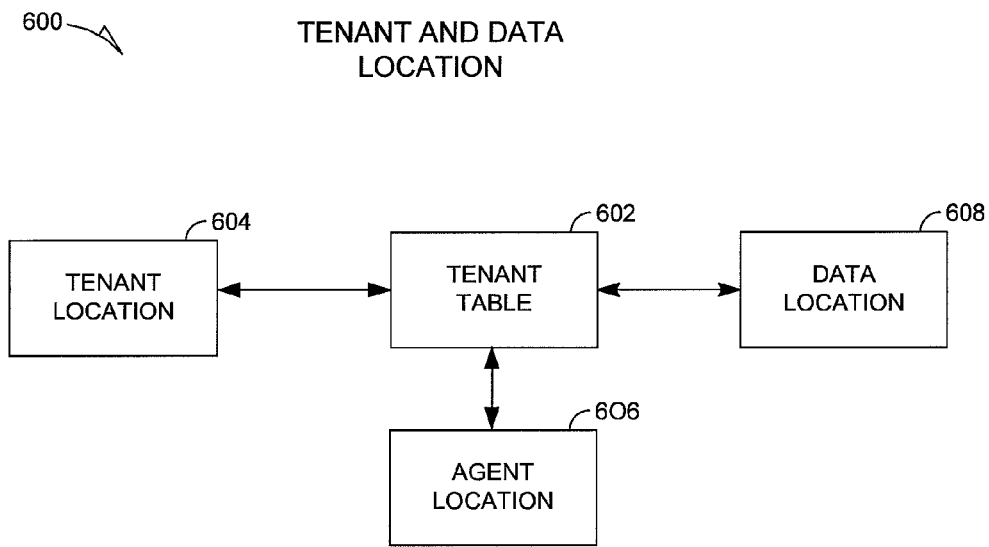
FIG. 6 is a high-level entity-relationship diagram, illustrating various tables that may be maintained within the user location databases, in accordance with an example embodiment.
FIG. 7 is a table showing an example tenant location table, in accordance with an example embodiment.
FIG. 8 is a table showing an example agent location table, in accordance with an example embodiment.
FIG. 9 is a table showing an example data location table, in accordance with an example embodiment.

FIG. 6 is a high-level entity-relationship diagram, illustrating various tables 600 that may be maintained within the tenant location database 247, and that are utilized by the tenant location module 248 and the data location module 246. The tenant table 602 includes a list of tenants associated with the networked contact center. The tenant table 602 may associate one or more dialed number identification service (DNIS) and/or automatic number identification (ANI) with each tenant.

The tenant location table 604 is to associate a tenant identification (ID) number (e.g., a DNIS) with an active platform and an inactive platform. When the active platform is operational and considered active, the active platform supports a corresponding tenant. When the active platform is not to be used, and back-up resources are to be used, the inactive platform supports the corresponding tenant. In example embodiments, back-up resources are to be used when the active platform fails and/or when the active platform is to be taken down for maintenance. FIG. 7 is a table 700 showing an example tenant location table 604, in accordance with an example embodiment. The table 700 may be maintained within the tenant location database 247. In an example embodiment, an incoming DNIS can be found in the table 700 and mapped to an active and inactive platform.

The agent location table 606 is to associate an agent ID with an active platform and an inactive platform. FIG. 8 is a table 800 showing an example agent location table 606, in accordance with an example embodiment. In an example embodiment, an agent may submit a user name and password via a web-based agent interface (e.g., served by the user interface module 510). The table 800 may be referenced to find an active and inactive platform corresponding to the submitted username and password.

The data location table 608 is to associate a tenant's data with a location in data storage. FIG. 9 is a table 900 showing an example data location table 608, in accordance with an example embodiment. Once a platform for a particular tenant has been determined, resources within the platform may request data associated with the tenant. In an example embodiment, a request for data may be classified by tenant and data type (e.g., recording data). The table 900 may be used to identify a location associated with a request for tenant data of a particular type. In some example embodiments, a back-up location for the data may also be mapped to tenant data. The back-up location may be accessed in failover that may occur with or without human intervention and/or under maintenance conditions.

Figure 10:
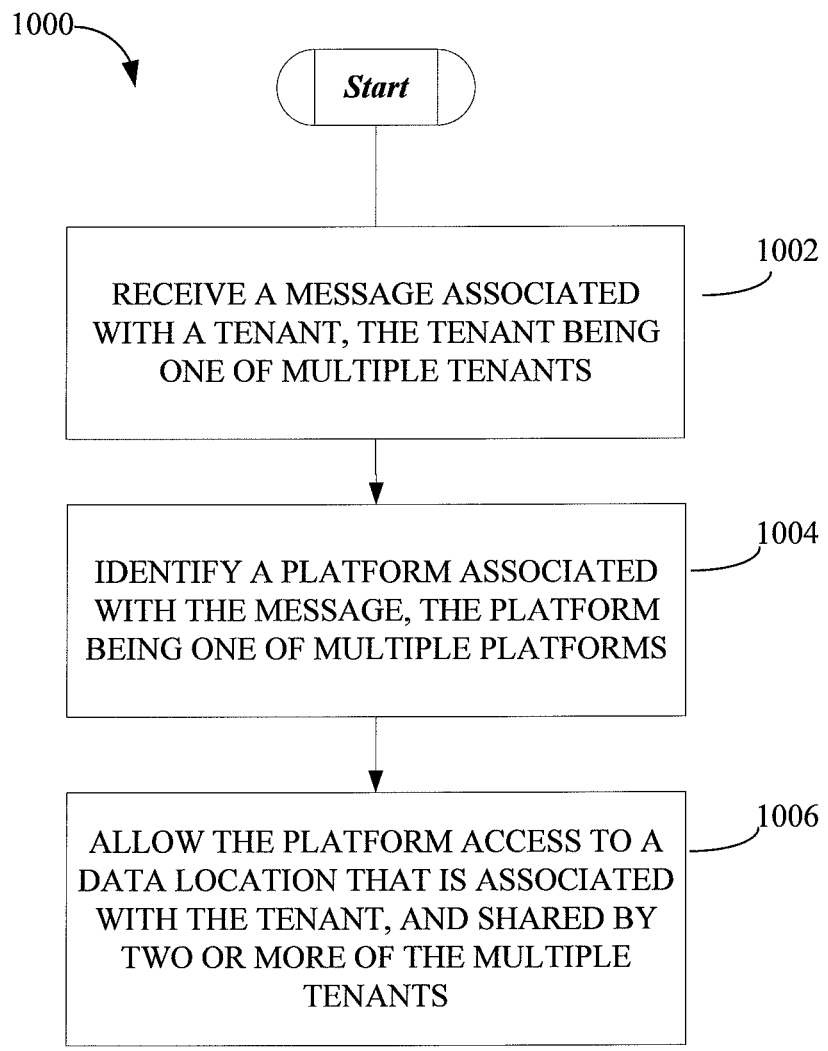
FIG. 10 is a flow diagram illustrating an example method for identifying a platform associated with a tenant, in accordance with an example embodiment.

FIG. 10 is a flow diagram illustrating an example method 1000 for identifying a platform associated with a tenant, in accordance with an example embodiment. The example method may be performed in the networked contact center 202 by the example tenant and data location modules 248 and 246 of FIG. 2. As disclosed above, the networked contact center 202 may support multiple tenants per platform machines 224-226. The tenants may relate to the platform machines 224-226 such that each of the multiple tenants is associated with one or more of multiple platforms.

At block 1002, the example method 1000 includes receiving a message associated with a tenant. The tenant may be one of the multiple tenants supported by the networked contact center 202. In various example embodiments, the routing module 262 may receive an electronic communication (e.g., a DNIS, ANI, web logon, chat or other communication, etc.) from a customer or an agent of a tenant. If the routing module 262 does not find a platform (e.g., a platform from the platform machines 224-226) corresponding to the communication, the routing module 262 may transmit a message to the tenant location module 248 to request the identity of a corresponding platform. The message may include attributes of the received electronic communication (e.g., a unique ID such as a DNIS or a username and password combination) may be associated with a particular tenant and platform.

At block 1004, the example method includes identifying a particular platform associated with the message, the platform (e.g., the platform 226) being one of the multiple platform machines 224-226 within the networked contact center 202. The example tenant location module 248 may look up the unique ID or indicator in the tenant location database 247 (e.g., in the tenant location table 604) and find a platform or platforms that support the tenant associated with the message. In various example embodiments, the electronic communication is a telephone call that the routing module routes to the corresponding platform after obtaining the platform's identity from the tenant location module 248. The routing module 262 may update the routing database 268 to map the indicator or unique ID to the corresponding platform for possible future use. In various other embodiments, the electronic communication may be a logon request from an agent, and the tenant location module 248 itself may map the agent communication to the appropriate platform. In some embodiments, the identified platform may be designated in the tenant location database 247 as an active platform, relative to an inactive platform.

At block 1006, the example method includes allowing the identified platform access to a data location that is both associated with the tenant and shared by two or more of the multiple tenants. As disclosed above, a message from a customer or an agent of a tenant may be routed to an appropriate platform. In various example embodiments, the platform may process the message and request data associated with the message. In some example embodiments, a set of instructions (e.g., the resource module(s) 270) may be executed by platform machines (e.g., platform machine 224) to transmit a request for data to the data location module 246. The set of instructions may be associated with one or more of the tenants supported by the platform to which the customer or agent message has been routed. As previously described, resource module(s) such as the resource module(s) 270 may initially request data from the extraction module 232, which may request the data from the configuration module 236, which may request the data location from the data location module 246.

In an example embodiment, the data location module 246 may access the configuration data location database 252 to look up the location of the requested data in the data location table 608. In some example embodiments, the data location depends on both the tenant and the type of data being requested as shown in the table 900. Example instructions may be related to a resource module and generate a request for data such as the skills held by a tenant's agents. Such data may be used to match a customer's needs with the tenant's available resources. As disclosed with respect to FIG. 5, other types of data may be requested by the instructions or resource modules 503-512.

Once the location of the requested data has been obtained by the data location module 246, the data location module 246 may transmit the data location to the configuration module 236, which may retrieve the data from the particular data location and deliver the data to the requesting resource module (e.g., one of the resource modules 502 within the resource module(s) 270). The resource modules 502 may use the data for any of the reasons disclosed with respect to FIG. 500.

Figure 11:
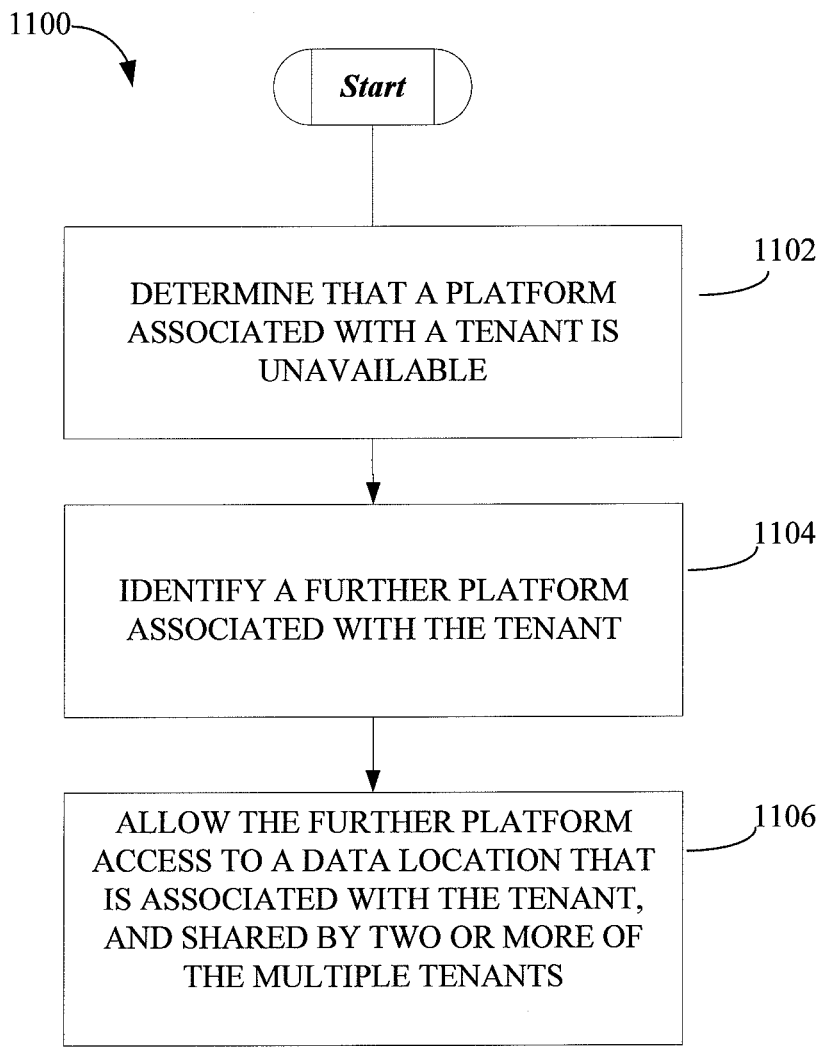
FIG. 11 is a flow diagram showing an example method for identifying a further platform associated with the tenant, in accordance with an example embodiment.

FIG. 11 is a flow diagram showing an example method 1100 for identifying a further platform (e.g., platform 225) associated with the tenant, in accordance with an example embodiment.

At block 1102, the method may include determining that the particular platform (e.g., a platform designated as being active, such as platform machine 224) is unavailable. For different reasons, a platform supporting a particular tenant may become unavailable. A platform may fail, for example, when the platform or part of the platform does not recover from an error (e.g., a hardware or software error). In some example embodiments, the tenant location module 248 is to detect platform unavailability by detecting a signal generated automatically and without human intervention, in response to platform failure. A platform may also become unavailable when a platform or part of a platform is taken out of service to perform maintenance. In an example embodiment, a platform switch command is entered by an administrator from a control console to notify the tenant location module 248 that a tenant's active platform is unavailable.

At block 1104, the example method includes identifying a further platform (e.g., a platform designated as being inactive, such as platform machine 225) associated with the tenant. Responsive to notification that an active platform associated with the tenant is unavailable, the tenant location module 248 may look up an inactive platform for the tenant in the tenant location table 604 within the tenant location database 247. The tenant location module 248 may then update the tenant location table 604 in the tenant location database 247 to change a classification of the further platform (e.g., the inactive platform) from an inactive platform to an active platform. In various example embodiments, the tenant location module 248 may generate and transmit a notification to the configuration module 236 to cause the configuration module 236 to discard any existing tenant location information for the tenant, and to request new location data from the tenant location module 248. Alternatively or additionally, the tenant location module 248 may cause the routing module 262 (e.g., a session initiation protocol (SIP) proxy or other router) to discard existing routing information for the tenant, so that the routing module 262 will request new tenant location data from the tenant location module 248 when further communications directed to the tenant are received (e.g., from a customer).

At block 1106, the example method may include allowing the further platform to access the data location that is both associated with the tenant and shared by the two or more of the multiple tenants. Access to the data location may be allowed via the configuration module 236 as described above.

Figure 12:
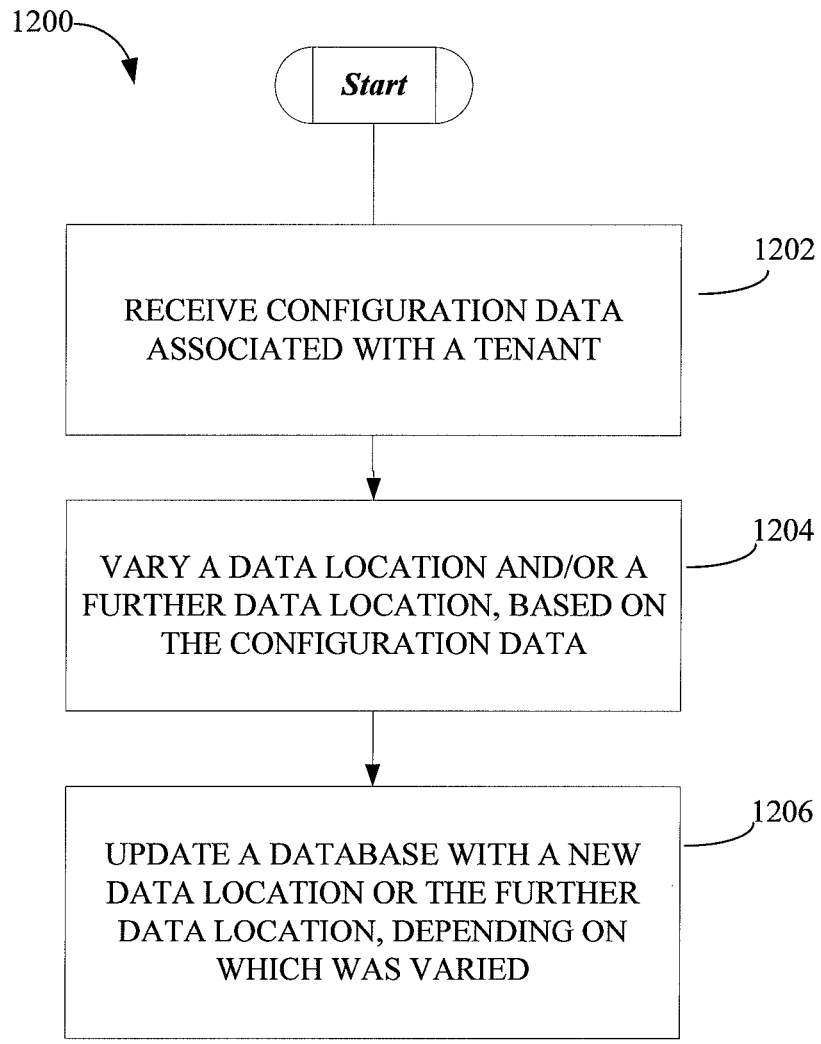
FIG. 12 is a flow diagram showing an example method for configuring tenant data, in accordance with an example embodiment.

FIG. 12 is a flow diagram showing an example method 1200 for configuring tenant data, in accordance with an example embodiment. At block 1202, the method 1200 may include receiving configuration data associated with the tenant. In some example embodiments, a supervisor may logon to the user interface module 510 of FIG. 500 in order to make a change to the configuration of a particular tenant. For example, the supervisor may logon to add an agent and populate an agent profile for the agent.

Block 1204 of the method 1200 may include varying at least one of the data location and a further data location, based on receiving the configuration data. In such an example embodiment, additions and/or changes may be communicated to the configuration module 236, which may in turn access the configuration data databases 240 to store corresponding tenant data additions and/or changes. In some example embodiments, the configuration module 236 informs the data location module 246 of any changes in location of the tenant data.

Block 1206 of the example method 1200 includes updating a database with a new data location or the further data location, depending upon which was varied. The data location module 246 may update the configuration data location database 252 in response to receiving notice of changes to the tenant data from the configuration module 236. The data location module's 246 knowledge of the location of tenant data for all of the tenants supported by the platform machines 224-226 may allow the tenant data to be located within repositories shared by multiple tenants and may further allow the tenant data to be abstracted between the platform layer and the storage layer.

Computer System

Figure 13:
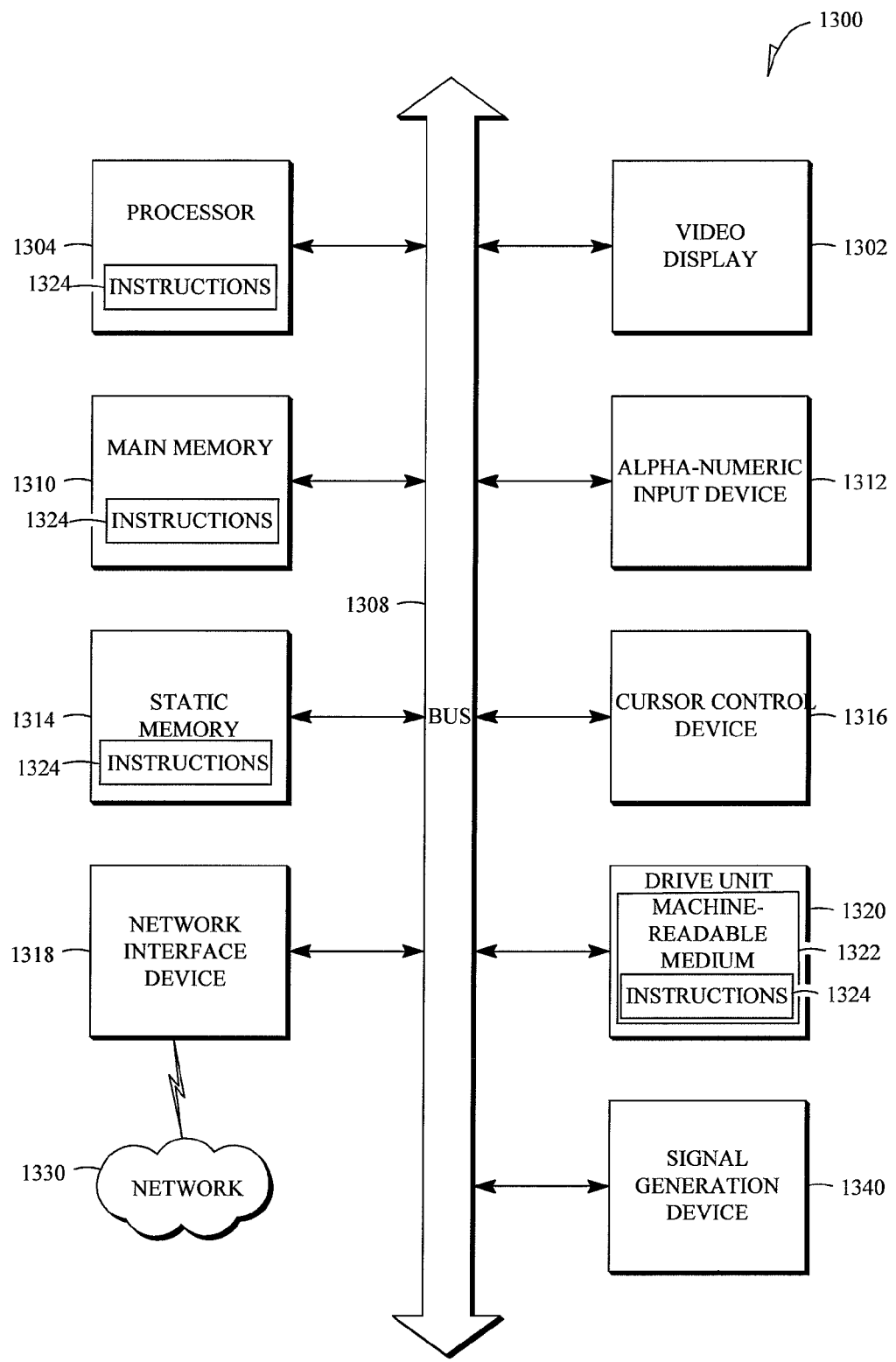
FIG. 13 is a block diagram showing an example machine, in accordance with example embodiments.

FIG. 13 shows a diagrammatic representation of a machine in the example form of a computer system 1300 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1304 (e.g., a central processing unit (CPU), a graphics processing unit (GPU) or both), a main memory 1310 and a static memory 1314 which communicate with each other via a bus 1308. The computer system 1300 may further include a video display unit 1302 (e.g., a liquid crystal display (LCD) or a cathode ray tube (CRT)). The computer system 1300 also includes an alphanumeric input device 1312 (e.g., a keyboard), a cursor control device 1316 (e.g., a mouse), a disk drive unit 1320, a signal generation device 1340 (e.g., a speaker) and a network interface device 1318.

The disk drive unit 1320 includes a machine-readable medium 1322 on which is stored one or more sets of instructions 1324 (e.g., software) embodying any one or more of the methodologies or functions described herein. The instructions 1324 may also reside, completely or at least partially, within the main memory 1310 and/or within the processor 1304 during execution thereof by the computer system 1300, the main memory 1310 and the processor 1304 also constituting machine-readable media.

The instructions 1324 may further be transmitted or received over a network 1330 via the network interface device 1318.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present subject matter. The term "machine-readable medium" shall accordingly be taken to include, but not be limited to, solid-state memories, optical and magnetic media and carrier wave signals.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. An apparatus comprising:
    a networked contact center including a plurality of platforms configured and arranged for hosting a plurality of tenants and including a plurality of data locations associated with the plurality of tenants, each of the plurality of data locations configured and arranged for storing data;
    an arrangement of computer processors including a computer processing module configured and arranged to perform operations for hosting at least one tenant of the plurality of tenants on a first of the plurality of platforms and another computer processing module configured and arranged to replicate said operations for hosting on at least a second of the plurality of platforms, wherein one of the computer processing modules is arranged as an active platform while the other of the computer processing modules is arranged as an inactive platform with the inactive platform being arranged to relieve the active platform for hosting said at least one tenant when the active platform is nonresponsive;
    the arrangement of computer processors being further configured and arranged for associating at least one of the plurality of data locations with the at least one tenant, for performing operations for uploading tenant configuration data on the associated at least one of the plurality of data locations, and for receiving a message associated with a communication from the at least one tenant, wherein based on an indication that the first of the plurality of platforms is nonresponsive, at least one platform from the at least the second of the plurality of platforms is configured and arranged to provide the services for hosting.

2. The apparatus of claim 1, wherein the arrangement of computer processors is configured and arranged to receive the message via at least one of an Internet network and a public switched telephone system network.

3. The apparatus of claim 1, wherein the message is further associated with an interaction between a customer of the at least one tenant and an agent of the at least one tenant.

4. The apparatus of claim 1, wherein the message is further associated with an interaction between an agent of the at least one tenant and the networked contact center.

5. The apparatus of claim 1, wherein the at least one tenant is associated with a set of instructions to be executed by a machine within the first of the plurality of platforms, and the at least the second of the plurality of platforms, and the arrangement of computer processors is further configured and arranged to perform operations comprising:
    routing the message to the set of instructions; and receiving a request for data based on executing the set of instructions.

6. The apparatus of claim 1, wherein the arrangement of computer processors is configured and arranged to update a database to vary a classification for the at least one tenant of the at least the second of the plurality of platforms, from an inactive platform to an active platform.

7. The apparatus of claim 1, wherein the tenant configuration data includes a list of agents and skills of the agents.

8. The apparatus of claim 1, wherein the plurality of platforms includes call distribution software, skills based routing software, and an agent web interface.

9. A method comprising:
- at a networked contact center that includes a plurality of platforms to host a plurality of tenants, the networked contact center further including a plurality of data locations associated with the plurality of tenants:
- hosting at least one tenant of the plurality of tenants on a first of the plurality of platforms;
- replicating the hosting of the at least one tenant on at least a second of the plurality of platforms;
- associating at least one of the plurality of data locations with the at least one tenant;
- uploading tenant configuration data on the associated at least one of the plurality of data locations;
- receiving a message associated with the at least one tenant from a public data-communication network and, in response, providing data useful for further communications associated with the message; and
- based on an indication that the first of the plurality of platforms is unavailable, selecting at least one platform from the at least the second of the plurality of platforms upon which the hosting of the at least one tenant was replicated.

10. The method of claim 9, wherein the message is further associated with an interaction between a customer of the at least one tenant and an agent of the at least one tenant.

11. The method of claim 9, wherein the message is further associated with an interaction between an agent of the at least one tenant and the networked contact center.

12. The method of claim 9, wherein the at least one tenant is associated with a set of instructions to be executed by a machine within the first of the plurality of platforms and the at least the second of the plurality of platforms, the method further comprising:
- routing the message to the set of instructions; and
- receiving a request for data based on executing the set of instructions.

13. The method of claim 9, further comprising:
- updating a database to vary a classification for the at least one tenant of the at least the second of the plurality of platforms from an inactive platform to an active platform.

14. The method of claim 9, wherein the tenant configuration data includes a list of agents and skills of the agents.

15. The method of claim 9, wherein the plurality of platforms includes call distribution software, skills based routing software, and an agent web interface.

* * * * *